United States Patent
Liu et al.

(10) Patent No.: US 7,555,737 B2
(45) Date of Patent: Jun. 30, 2009

(54) AUXILIARY METHOD FOR CIRCUIT DESIGN

(75) Inventors: Hsien Ming Liu, Hsinchu (TW); Chien Jung Hsin, Hsinchu (TW); Jun Jyeh Hsiao, Hsinchu (TW); Sheng Chun Lee, Hsinchu (TW); Chun Wei Lo, Hsinchu (TW)

(73) Assignee: Dorado Design Automation, Inc., Hsin Chu (TW)

( * ) Notice: Subject to any disclaimer, the term of this patent is extended or adjusted under 35 U.S.C. 154(b) by 148 days.

(21) Appl. No.: 11/564,422

(22) Filed: Nov. 29, 2006

(65) Prior Publication Data

US 2007/0124712 A1 May 31, 2007

(30) Foreign Application Priority Data

Nov. 29, 2005 (TW) ............... 94141960 A (51) Int. Cl.
*G06F 17/50* (2006.01)
(52) U.S. Cl. ............................. 716/6; 716/10
(58) Field of Classification Search .............. 716/6, 716/10
See application file for complete search history.

(56) References Cited

U.S. PATENT DOCUMENTS 5,508,937 A 4/1996 Abato et al.
6,804,810 B1 * 10/2004 Petersen et al. ............... 716/12
2002/0023252 A1 * 2/2002 Lee et al. ....................... 716/6
2002/0078425 A1 * 6/2002 Mehrotra et al. ............... 716/6

OTHER PUBLICATIONS

Edamatsu et al., Pre-layout delay calculation specification for CMOS ASIC libraries, Proceedings of the Asia and South Pacific Design Automation Conference 1998, Feb. 1998, pp. 241-248.*

* cited by examiner

*Primary Examiner*—Vuthe Siek
*Assistant Examiner*—Aric Lin
(74) *Attorney, Agent, or Firm*—Kirton & McConkie; Evan R. Witt (57) ABSTRACT

For accomplishing a circuit design, a first physical design is implemented according to a first netlist to obtain a first physical layout of a circuit. The first physical layout of the circuit is processed to obtain a first timing data. The first timing data is then inputted for timing verification of the first netlist. If the first netlist does not pass the verification, the first netlist is modified into a second netlist, while defining a modified portion of the netlist. Then, the modified portion of netlist is processed to obtain a second timing data, and the second timing data is used to overwrite a part of the first timing data. The first physical design is modified into a second physical design according to the second netlist only when the second netlist with the first timing data overwritten by the second timing data passes the timing verification, thereby improving time efficiency.

19 Claims, 13 Drawing Sheets

AUXILIARY METHOD FOR CIRCUIT DESIGN

FIELD OF THE INVENTION

The present invention relates to an auxiliary method for designing circuit of a computer system.

BACKGROUND OF THE INVENTION

Figure 1:
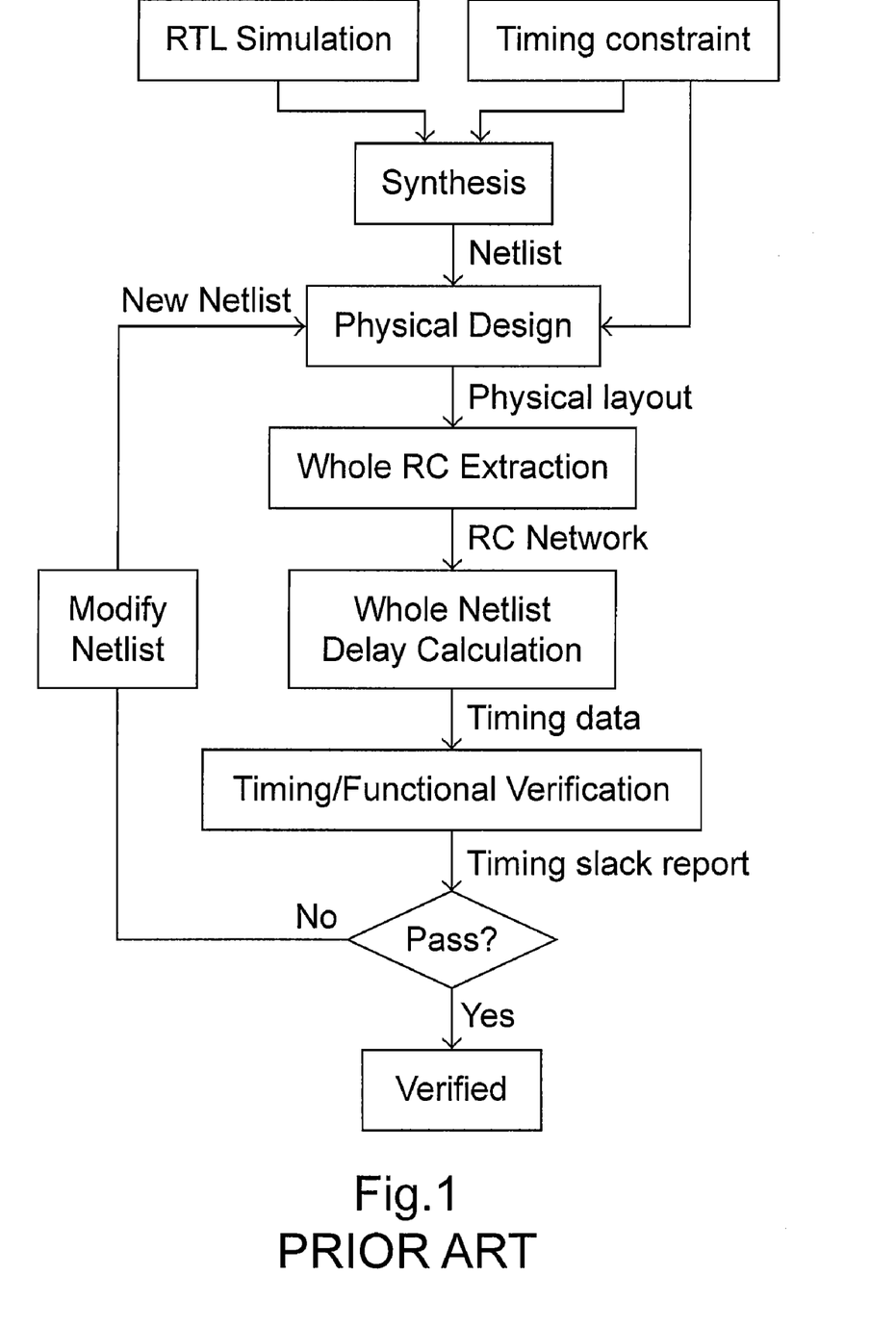
FIG. 1 is a flowchart illustrating a conventional IC design process.

FIG. 1 depicts a flowchart illustrating an IC design procedure used widely at present. First, designers utilize a tool program to perform RTL (Register Transfer Level) simulation and designate timing constraint for synthesis, so as to generate a netlist. The netlist is processed in the next step for physical design.

After the placement and routing procedures in the physical design are finished, the physical layout can be converted to a practical RC network by way of RC extraction software. The RC network is then processed with whole netlist delay calculation to generate timing data. Afterwards, timing verification and functional verification are performed to assure of correct design. If the verifications fail, designers will need to modify the netlist by way of an ECO (Engineering Change Order) process, and thus physical design and all the subsequent procedures need to start over. During the timing verification, a timing slack report will be obtained to determine whether the design is qualified or not and/or point out the failure parts of the circuit required to be modified. The result of the functional verification, on the other hand, can be realized with the RTL simulation and the netlist simulation.

As described above, all the steps beginning with the physical design and including placement, routing, whole netlist RC Extraction, whole netlist delay calculation and timing/functional verification of the ECO procedures need to be performed once again whenever the netlist is modified. Then, in response to the new timing slack report, all the above procedures may need to be performed again if the timing and/or function still fail in the verification. The repeated and complicated procedures will spend a lot of time and thus may delay the commercialization of products. For more and more sophisticated chip design, the whole netlist RC Extraction and whole netlist delay calculation particularly form a burden of designers.

SUMMARY OF THE INVENTION

Therefore, the present invention provides an auxiliary method for a circuit design for use in a computer system, which skips some complicated procedures from the modifying and verifying process of physical design.

The present invention relates to an auxiliary method for circuit design, which includes steps of: a) implementing a first physical design according to a first netlist to obtain a first physical layout of a circuit; b) processing the first physical layout of the circuit to obtain a first timing data; c) performing timing verification of the first netlist according to the first timing data; d) modifying the first netlist into a second netlist if the first netlist does not pass the timing verification, while defining a first modified portion of netlist; e) processing the first modified portion of netlist to obtain a second timing data; f) performing timing verification of the second netlist according to the first timing data that is partially modified with the second timing data; and g) modifying the first physical design into a second physical design according to the second netlist if the second netlist passes the timing verification.

In an embodiment, the auxiliary method further includes the following steps after the step g): h) implementing the second physical design according to the second netlist to obtain a second physical layout of the circuit; i) processing the second physical layout of the circuit to obtain a third timing data; j) performing timing verification of the second netlist according to the third timing data; and k) completing the circuit design if the second netlist passes the timing verification of the step j). The first physical layout of the circuit in the step b) and the second physical layout of the circuit in the step i) are processed with whole RC extraction and whole netlist delay calculation, and the first modified portion of netlist in the step e) is processed with RC estimation and incremental delay calculation.

In an embodiment, the auxiliary method further includes the following steps after the step f): l) modifying the second netlist into a third netlist if the second netlist does not pass the timing verification, while defining a second modified portion of netlist; m) processing the second modified portion of netlist to obtain a fourth timing data; n) performing timing verification of the third netlist according to the first timing data that is partially modified with the second timing data and then the fourth timing data; and o) modifying the first physical design into a third physical design according to the third netlist if the third netlist passes the timing verification. The first physical layout of the circuit in the step b) is processed with whole RC extraction and whole netlist delay calculation, and the first modified portion of netlist and second modified portion of netlist in the steps e) and m) are processed with partial RC estimation and incremental delay calculation.

In an embodiment, the first physical layout of the circuit in the step b) is processed with whole RC extraction and whole netlist delay calculation. The first modified portion of netlist in the step e) is processed with partial RC estimation and incremental delay calculation.

In an embodiment, the RC estimation includes sub-steps of: inputting netlist modification data, placement database and RC statistic database to an RC estimator; using the RC estimator to build a routing estimation tree with a driver pin of each modified net as a root and a sink pin of the modified net as a leaf, wherein the positions of the roots and leaves of the routing estimation tree are realized from the placement database, and positions of sub-nodes of the modified nets are determined by relative positions of the leaves; and estimating resistance and capacitance per unit length according to the RC statistic database, thereby obtaining estimated RC network.

In an embodiment, the first modified portion of netlist or second modified portion of netlist includes at least a modified cell, a first cell whose timing data varying with the change of the modified cell and a second cell that adjoins the first cell and whose timing data not varying with the change of the modified cell.

In an embodiment, when pin transition timing data of each cell included in the first modified portion of netlist is known, the incremental delay calculation includes sub-steps of: using an incremental delay calculator to calculate timing data of each cell in the first modified portion of netlist, starting from the second cell, by propagating input transition timing data of the second cell. The RC estimator and the incremental delay calculator can be implemented with software.

In an embodiment, when pin transition timing data of each cell included in the first modified portion of netlist is unknown, the incremental delay calculation includes sub-steps of: using a DTCC device to calculate input transition timing data of the second cell; and using an incremental delay calculator to calculate timing data of each cell in the first modified portion of netlist by propagating input transition timing data of the second cell. The RC estimator and the incremental delay calculator can be implemented with software.

In an embodiment, the incremental delay calculator includes a delay calculator core for calculating timing data including cell delay, interconnect delay and pin transition timing data. The DTCC device includes a basic delay transition effective capacitance converter and an enhanced delay transition effective capacitance converter for deriving input transition timing data and output effective capacitance from the timing data obtained by the delay calculator core.

In an embodiment, the basic delay transition effective capacitance converter derives a solution set consisting of a plurality of solutions of input transition timing data and output effective capacitance by way of numerical analysis, and the enhanced delay transition effective capacitance converter selects one of the solutions according to practical design.

In an embodiment, the first netlist in the step d) is modified with an ECO process, e.g. a timing ECO process including cell sizing, buffer insertion or buffer removal. Optionally, the first netlist in the step d) is further modified with a functional ECO which includes replacement instance, deletion instance or connection change.

In an embodiment, the first timing data is modified with the second timing data and/or the fourth timing data by being partially overwritten by the second timing data and/or the fourth timing data.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 2:
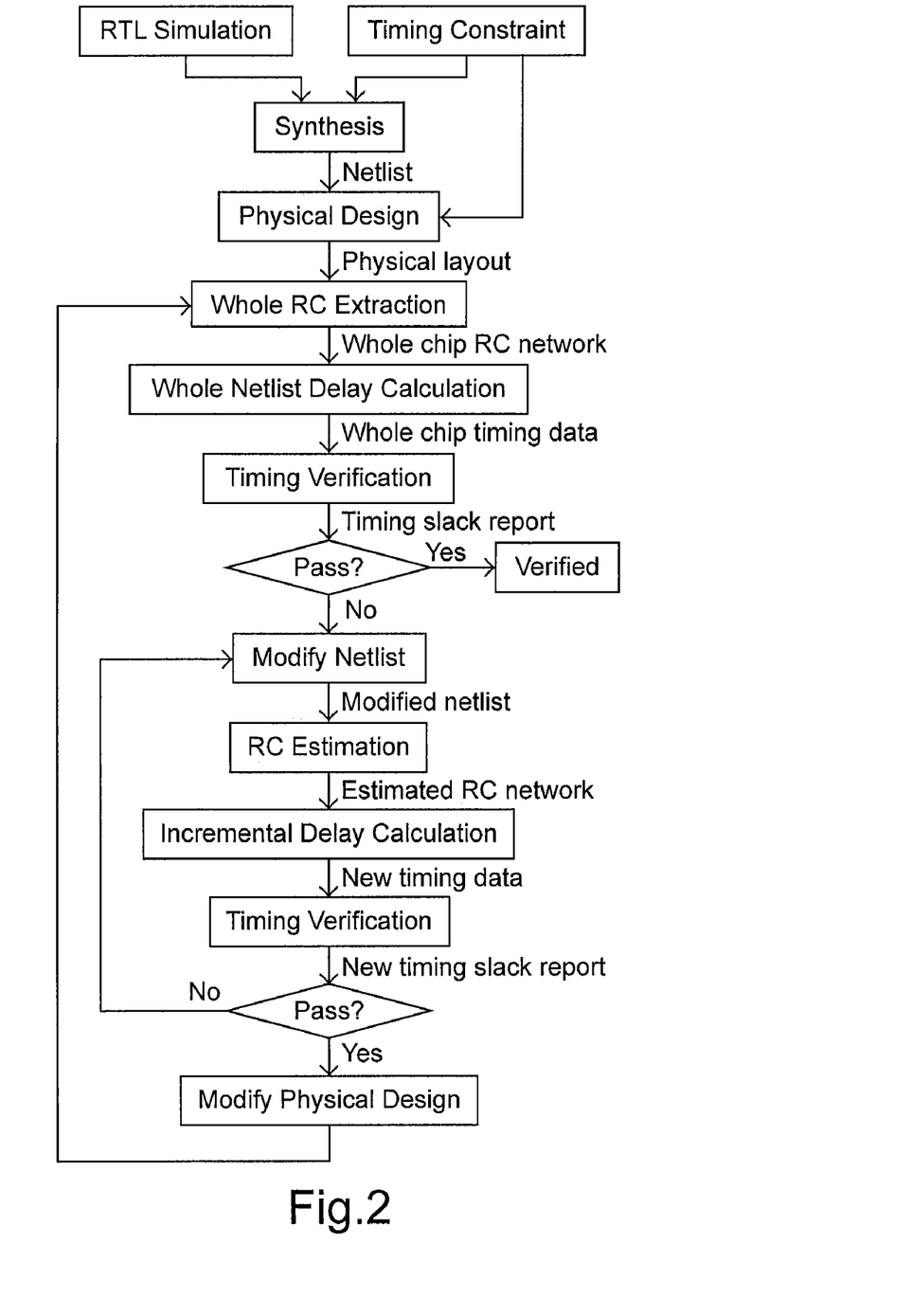
FIG. 2 is a flowchart illustrating an IC design process according to an embodiment of the present invention.

FIG. 2 depicts a flowchart illustrating an auxiliary method for circuit design according to an embodiment of the present invention. First, designers utilize a tool program to perform RTL (Register Transfer Level) simulation and designate timing constraint for synthesis, so as to generate a netlist. Physical design is made according to the netlist.

After the placement and routing procedures are done to implement the physical design, the physical layout is obtained and processed by RC extraction software to obtain a whole chip RC network. The RC network is then processed with whole netlist delay calculation to generate whole chip timing data. Afterwards, timing verification is performed to result in a timing slack report, which is based on to determine whether the design passes the verification. If the physical layout passes the timing verification, it means the design is correct. On the other hand, if the timing verification fails, designers need to modify the timing design of the netlist. Although only timing verification is exemplified above for verifying the design, functional verification can also be additionally performed to confirm if the circuit work normally. If the physical layout does not pass the functional verification, designers need to modify the functional design of the netlist. Accordingly, a modified netlist involving modified timing and/or functional design is obtained.

The inventors found a fact as a result of long-term engagement in the art that there are generally slight and localized differences between the primitive layout and the new layout resulting from the timing- and/or function-modified netlist. Based on this observation, the present invention does not implement the modified netlist into a new layout at once. Instead, the modified netlist (basically only the modification-associated portion of the netlist) is subjected to an RC Estimation procedure to generate an estimated RC network. Then, an incremental delay calculation procedure is performed to generate a timing data corresponding to the modification-associated portion of the netlist (hereinafter refer to "modified portion of netlist"). The timing data is then used to overwrite a part of the previous whole chip timing data to perform the timing verification of the new netlist so as to result in another timing slack report.

According to the updated timing slack report, whether the modified design passes the timing verification is realized. Optionally, functional verification (not shown) can be performed for the physical layout of the design circuit to realize if the circuit work normally. If the physical layout passes the timing verification and/or functional verification, it means the modification has been proper. On the other hand, if the timing verification fails, designers need to further modify the timing design of the netlist, or designers need to further modify the functional design of the netlist if the functional verification fails. Accordingly, a modified netlist is obtained. The above RC estimation, incremental delay calculation and netlist modification procedures are repeated until the resulting timing slack report shows success in verification. Afterwards, placement and routing procedures of the physical design are performed to generate a new physical layout. The whole chip RC network resulting from the physical layout by way of RC extraction is further processed with whole netlist delay calculation and timing/functional verification procedures again. If the design passes the verification, it means the design is correct and the auxiliary method is finished. In other words, according to the present invention, procedures such as the above-mentioned placement, routing, whole RC extraction and whole netlist delay calculation need not be performed until the new netlist has been verified.

Figure 3:
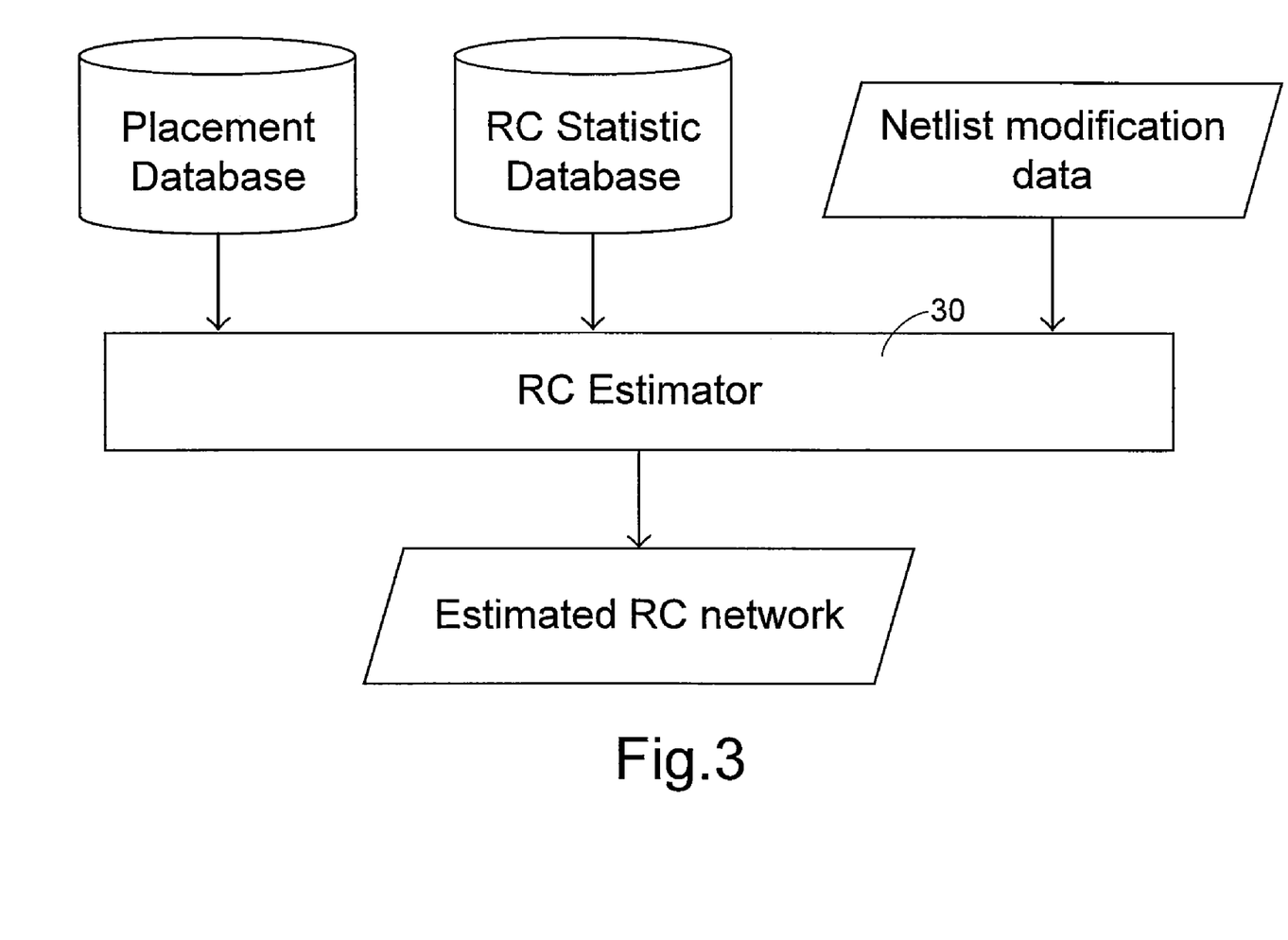
FIG. 3 is a scheme illustrating an example of RC Estimation for use in the auxiliary method FIG. 2.

As mentioned above, a modified RC network is generated as a result of RC estimation, which is illustrated in FIG. 3. For the derivation, three kinds of information are involved, i.e. the netlist modification data, the placement database such as the design exchange format (DEF), and RC statistic database such as library exchange format (LEF). Through the RC estimator 30, which can be implemented with software, the new netlist is compared with the old netlist to realize one or more modified nets. A routing estimation tree with a root implemented with a driver pin of one net and a leaf implemented with a sink pin of one net is built, e.g. Steiner Tree. The roots and leaves of Steiner Tree are available from the placement database, and the positions of sub-nodes of the modified nets can be determined according to relative positions among leaves. Once the sub-nodes are determined, the RC statistic information can be used to estimate the resistance and capacitance so as to generate the estimated RC network.

Figure 4A:
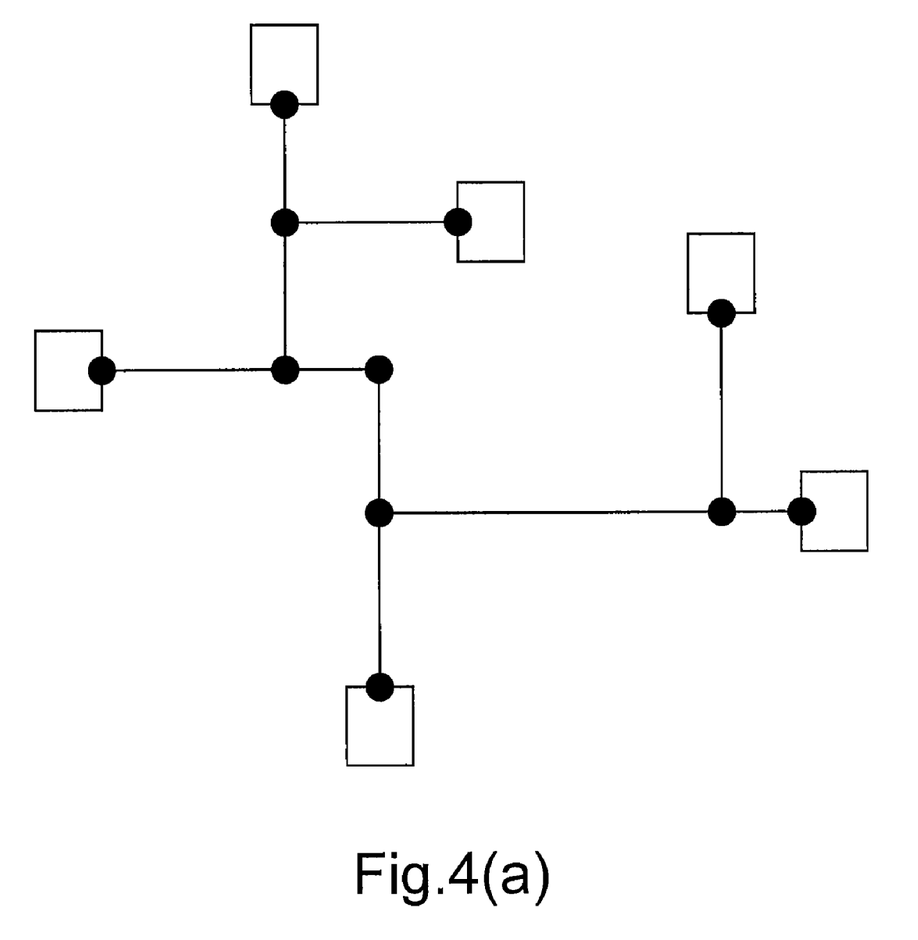
FIG. 4(a) is a scheme illustrating an example of Steiner Tree for use in the RC Estimation of FIG. 3.

An example of Steiner Tree is shown in FIG. 4(a). The black dots located at corners and junctions of sub-nodes indicate the spots crossing different metal layers in a layout. During RC estimation, three values $R_{unit}$, $R_{VIA}$ and $C_{unit}$ are determined first based on the RC statistic database, wherein $R_{unit}$ is an averaged resistance per unitary length in Steiner Tree, which is obtained by multiplying a resistance per unitary area by the minimum wire width W in each metal layer, and averaging the resulting resistances of all the metal layers;

$R_{VIA}$ is an averaged resistance crossing metal layers in Steiner Tree (i.e. the averaged resistance of the corners and sub-nodes), which is obtained by averaging resistances crossing every two metal layers; and $C_{unit}$ is an averaged capacitance per unitary length in Steiner Tree, which is obtained by adding an edge capacitance to a capacitance per unitary length in a metal layer, and averaging the resulting capacitances of all the metal layers.

The RC estimation between every two points $P_i(x_i, y_i)$ and $P_j(x_j, y_j)$ can be computed by software as follows.

Distance $d_{ij}$ between $P_i$ and $P_j$, $d_{ij}=|P_i-P_j|$;

Resistance $Rd_{ij}$ between $P_i$ and $P_j$, $Rd_{ij}=R_{unit}*d_{ij}$;

Overall resistance $R_{ij}$ between $P_i$ and $P_j$, $R_{ij}=Ri_{VIA}+Rd_{ij}+R_{j\,VIA}$;

Resistance $Rx_{VIA}$ at a corner or junction point $X$, $Rx_{VIA}=R_{VIA}$/number of branches at the junction point $X$; and Capacitance $C_{ij}$ between $P_i$ and $P_j$, $C_{ij}=C_{unit}*d_{ij}$.

Figure 4B:
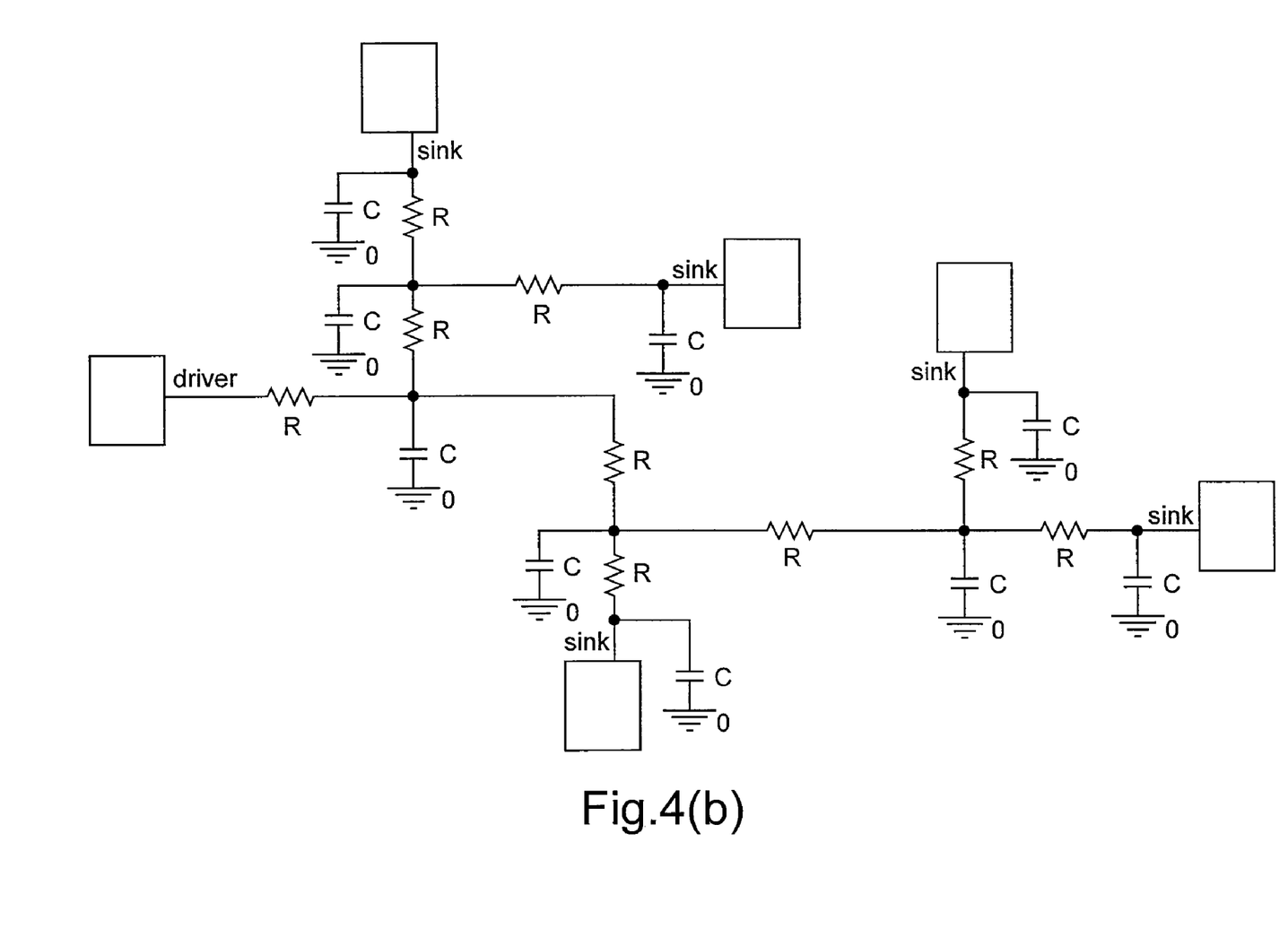
FIG. 4(b) is a circuit diagram of an RC network corresponding to the Steiner Tree of FIG. 4(a)

Through the above operations, the estimated RC network corresponding to the section of the Steiner Tree of FIG. 4(a) can be obtained as shown in FIG. 4(b). The modified portion of netlist is then operated with incremental delay calculation to result in partial timing data. The whole chip timing data is then partially overwritten by the partial timing data and inputted for subsequent timing verification of the new netlist.

Figure 5:
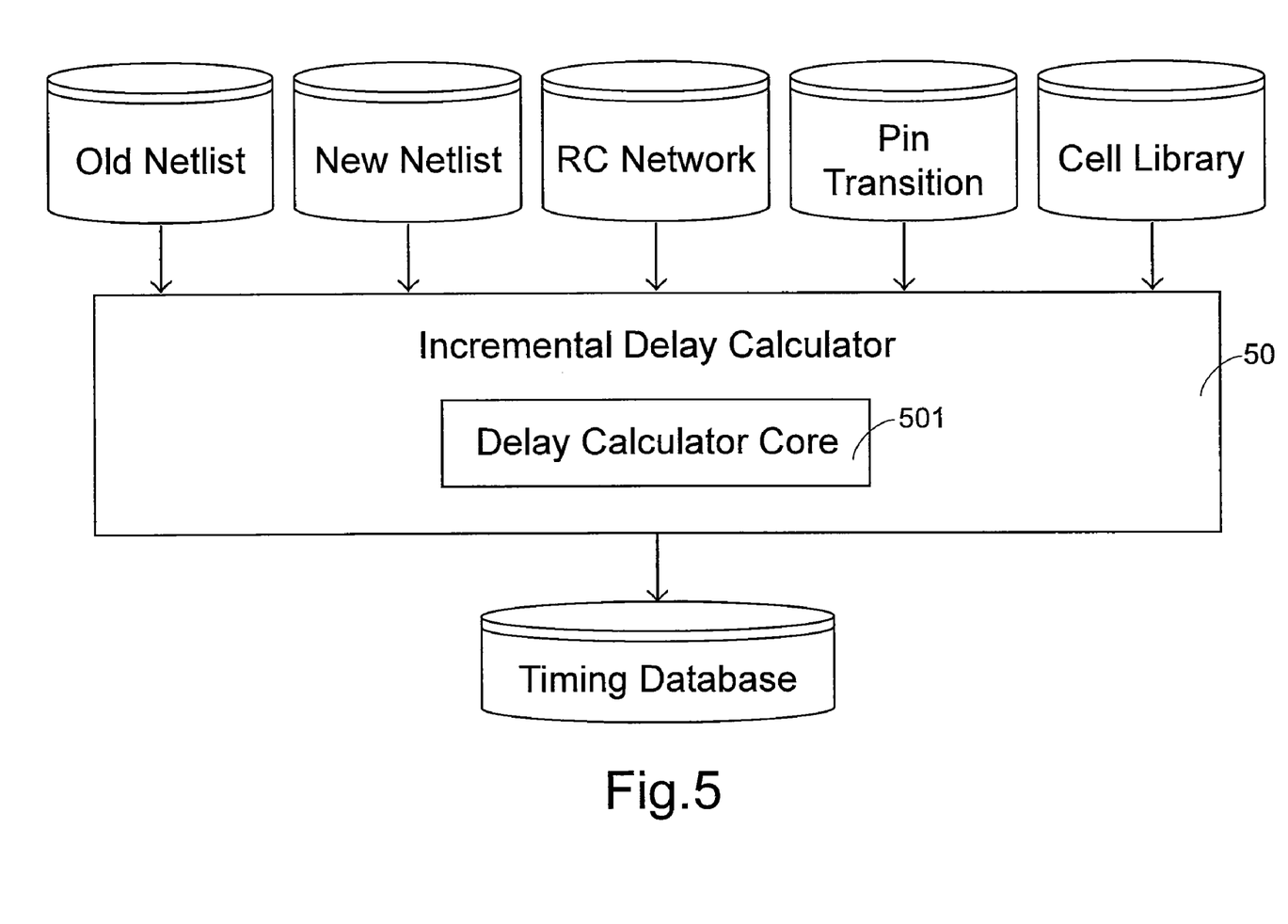
FIG. 5 is a scheme illustrating an example of incremental delay calculation for use in the auxiliary method FIG. 2.

In an embodiment of the present invention, conventional incremental delay calculation can be used to operate the modified portion of netlist. The conventional incremental delay calculation is performed on the condition that the pin transition timing data in each cell instance included in the primitive netlist is known. In this case, data including old netlist, new netlist, RC Network, pin transition timing data and cell library can be simply inputted into an incremental delay calculator 50, which is implemented with software, and operated to obtain timing database including cell delay, interconnect delay and pin transition timing data, as illustrated in FIG. 5. Details of such technology can be understood from U.S. Pat. No. 5,508,937 filed Apr. 16, 1996, which is incorporated herein for reference.

Figure 6:
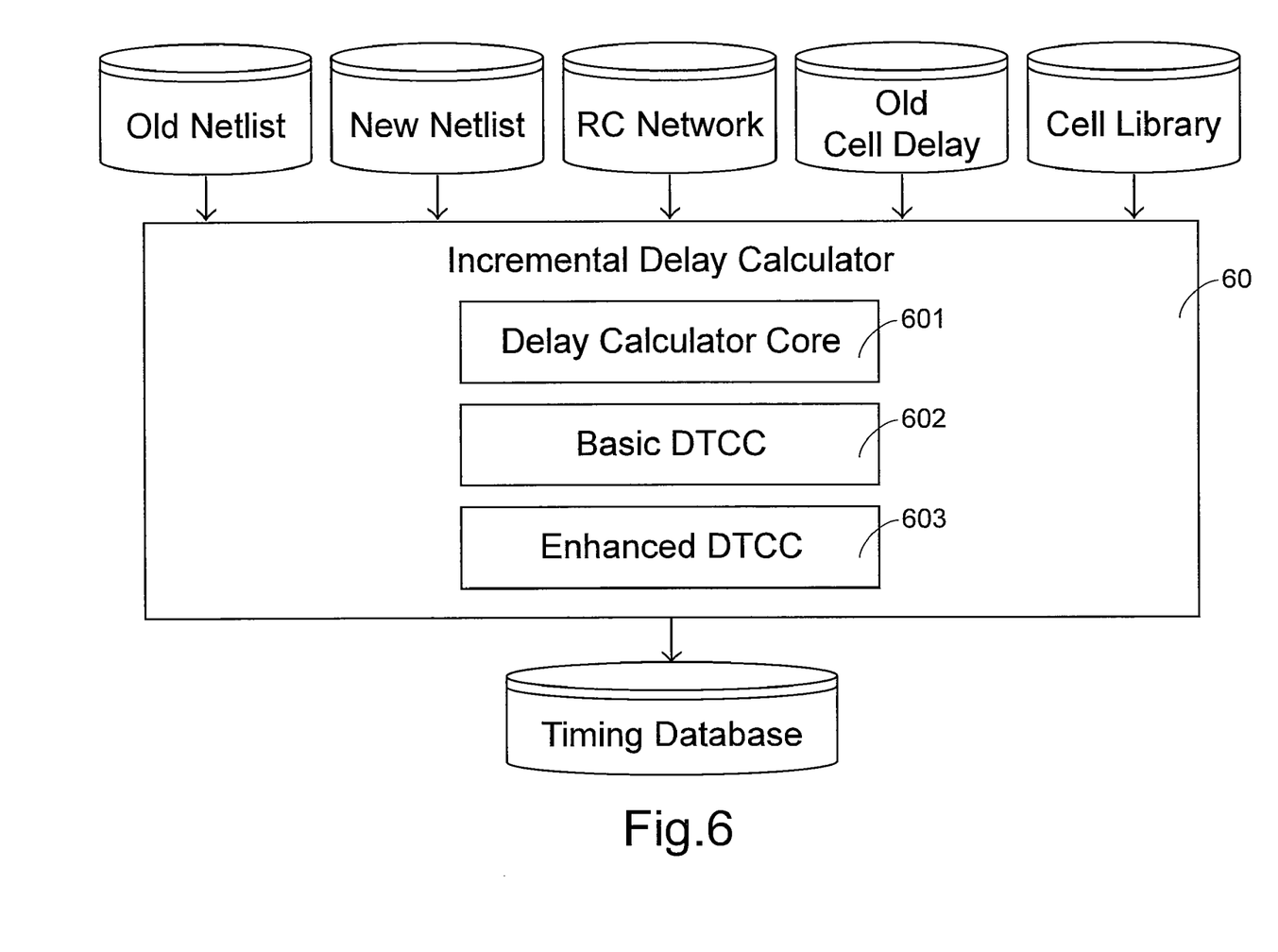
FIG. 6 is a scheme illustrating another example of incremental delay calculation for use in the auxiliary method FIG. 2.

However, the prior art does not deal with the situation that the pin transition timing data is unknown. Therefore, in another embodiment, new incremental delay calculation is proposed herein, which is capable of obtaining timing database including cell delay, interconnect delay and pin transition timing data without the input of the old pin transition timing data. In this embodiment, as illustrated in FIG. 6, an incremental delay calculator 60 is used to operate data including old netlist, new netlist, RC Network, old cell delay and cell library so as to obtain the required timing data. The database mentioned above can be in different formats. For example, the RC network database can be in a standard parasitic format (SPF), and the cell delay database can be in a standard delay format (SDF). The incremental delay calculator 60, which is implemented with software, includes a delay calculator core 601, a basic delay transition effective capacitance converter (basic DTCC) 602 and an enhanced delay transition effective capacitance converter (enhanced DTCC) 603. The delay calculator core 601 calculates timing data of cell delay and interconnect delay, and the basic DTCC 602 and enhanced DTCC 603 work with the delay calculator core 601 to reversely derive the input transition timing data and output effective capacitance from the cell delay data.

Figure 7:
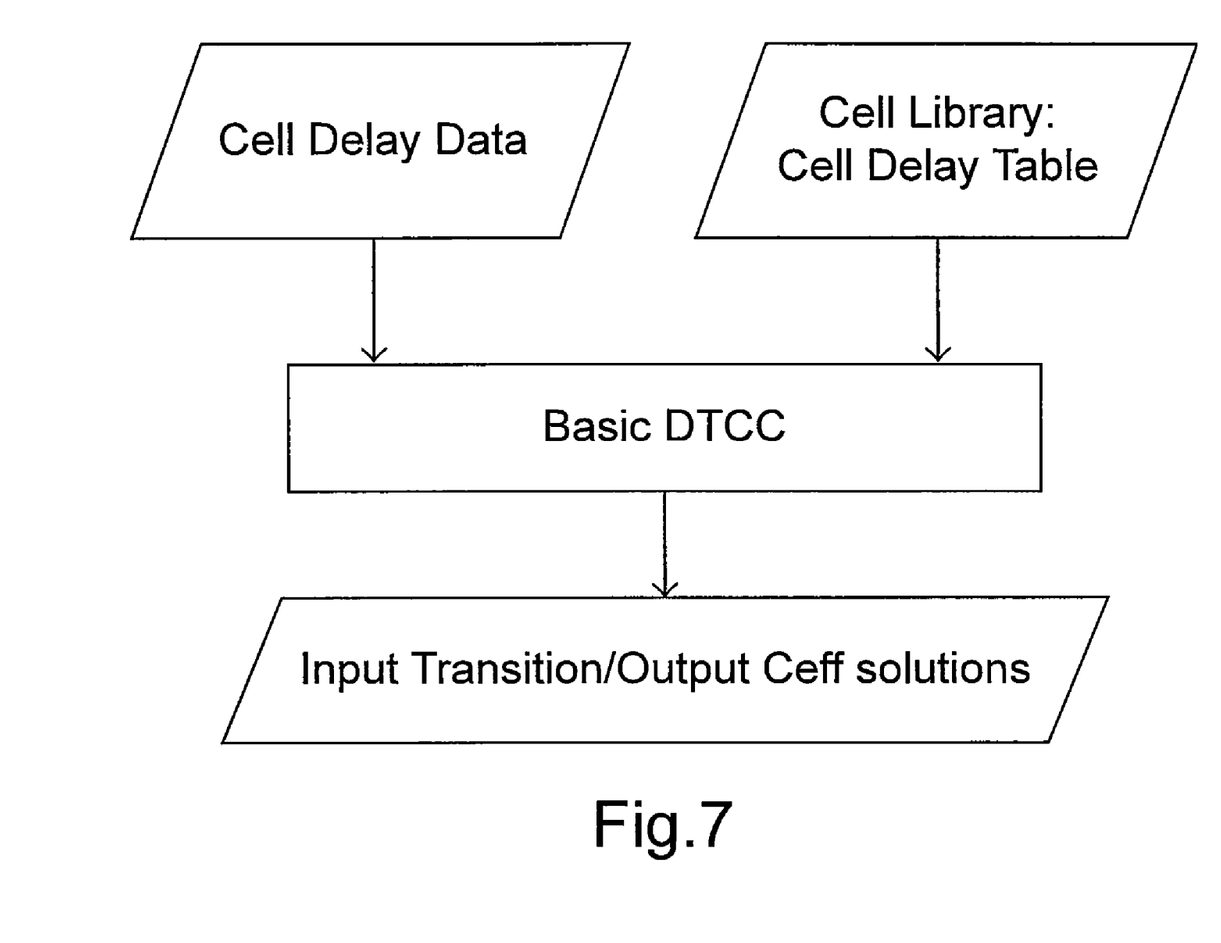
FIG. 7 is a scheme illustrating an example of basic DTCC for use in the incremental delay calculation of FIG. 6.

In the basic DTCC 602, the input transition timing data and output effective capacitance (Ceff) are derived from cell delay and cell library by way of numerical analysis, as illustrated in FIG. 7. An industrial standard "Synopsys Liberty" will be given as an example for further description. The following is a cell delay table existing in a cell library as a two-dimensional lookup table format. When the cell delay is 1.72 that lies in the marked frame of the table, the possible input transition timing data is ranged from 0.9 to 2.0, and the output Ceff is ranged from 0.15 to 0.39. Then, by way of bisection and interpolation, the input transition timing data and the output Ceff corresponding to the cell delay value 1.72 can be derived.

```
cell_rise(Tr_C_delay_6x6) {
    index_1 ("0.0500, 0.1000, 0.4000, 0.9000, 1.4000, 2.0000");
    index_2 ("0.00060, 0.03000, 0.06000, 0.15000, 0.27000, 0.39000");
    values ( \
        "0.3105,   0.4590,   0.6058,   1.0470,   1.6340,   1.2470" ,\
        "0.3198,   0.4683,   0.6151,   1.0560,   1.6430,   1.2610" ,\
        "0.3637,   0.5123,   0.6593,   1.1000,   1.6880,   1.3470" ,\
        "0.3910,   0.5396,   0.6865,   1.1270,   1.7150,   1.3560" ,\
        "0.3973,,  0.5459,   0.6928,   1.1340,   1.7210,   1.3810" ,\
        "0.3873,   0.5359,   0.6828,   1.1240,   1.7110,   1.3490" );
}
```

Figure 8:
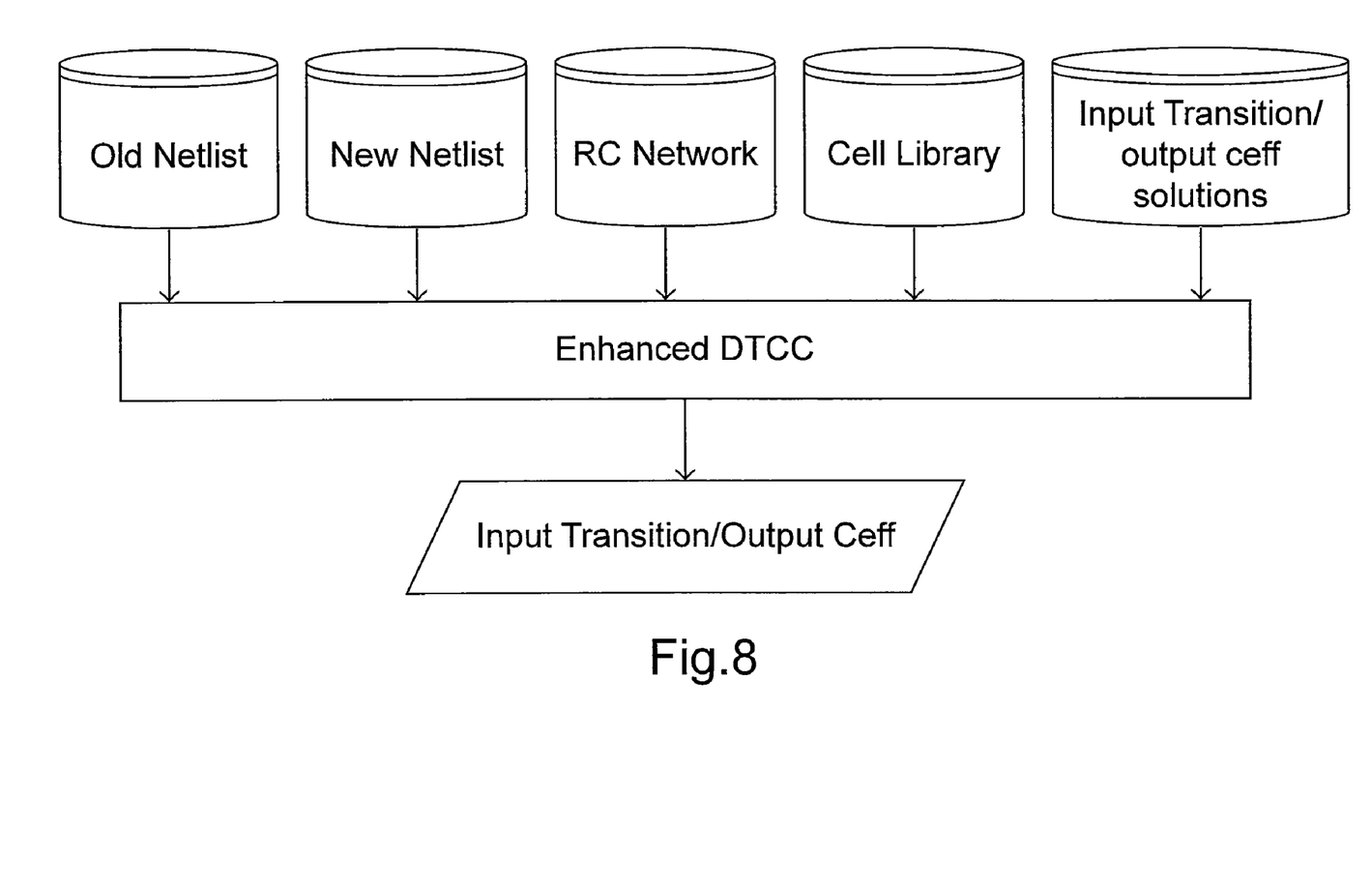
FIG. 8 is a scheme illustrating an example of enhanced DTCC for use in the incremental delay calculation of FIG. 6.

Since a solution set consisting of a plurality of solutions of input transition timing data and output Ceff to result in certain cell delay could be obtained by the basic DTCC 602, it is required to select only one of the solutions reflecting to the practical design. The task is executed by the enhanced DTCC 603. The data flow of the enhanced DTCC 603 is shown in FIG. 8. The solution set Si of input transition timing data and output Ceff is generated by the basic DTCC 602, wherein Si=(Trans_ini, Ceff_outi), where i=0, 1, . . . , n. The input transition timing data Tran_ini is then used to drive the RC network actually connected to the cell, and operated by the enhanced DTCC 603 along with the delay calculator core 601 to generate a driven effective capacitance Ceff_drivei. If one of the output effective capacitance Ceff_outj approximates to the driven effective capacitance Ceff_drivej, it means the solution Sj=(Trans_inj, Ceff_outj) is the correct one.

Referring back to the above example that the cell delay value is 1.72, four solutions S0(1.39, 0.269), S1(1.38, 0.272), S2(1.41, 0.268) and S3(1.405, 0.271) are obtained after the cell delay value 1.72 is inputted to be operated by the basic DTCC 602. Then, after driving the RC network and checking the relationship between the output effective capacitance and the driven effective capacitance for each solution via the enhanced DTCC 603, the correct solution can be obtained.

Figure 9A:
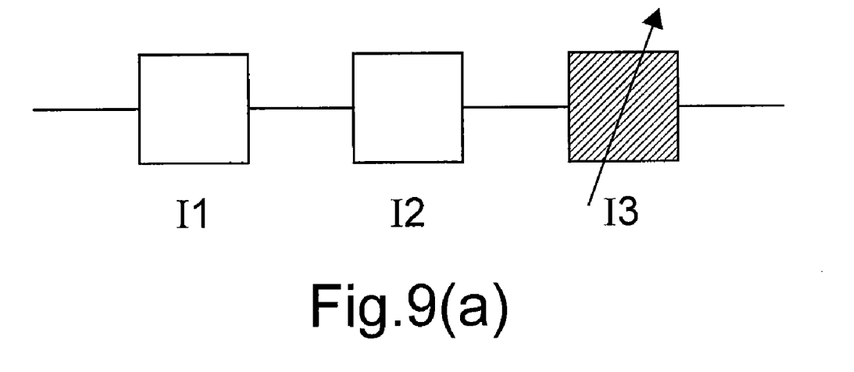
FIGS. 9(a), 9(b), and 9(c) are diagrams illustrating three examples of Timing ECO, respectively.
Figure 9B:
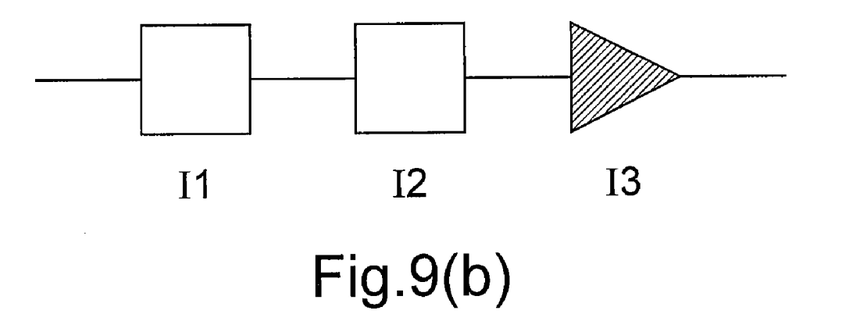
Figure 9C:
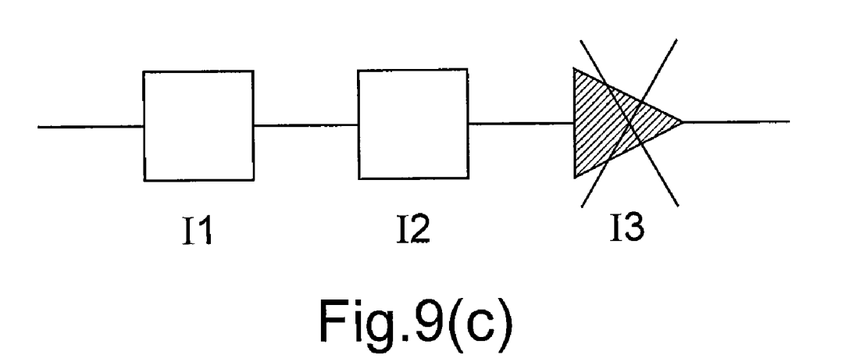
Figure 10A:
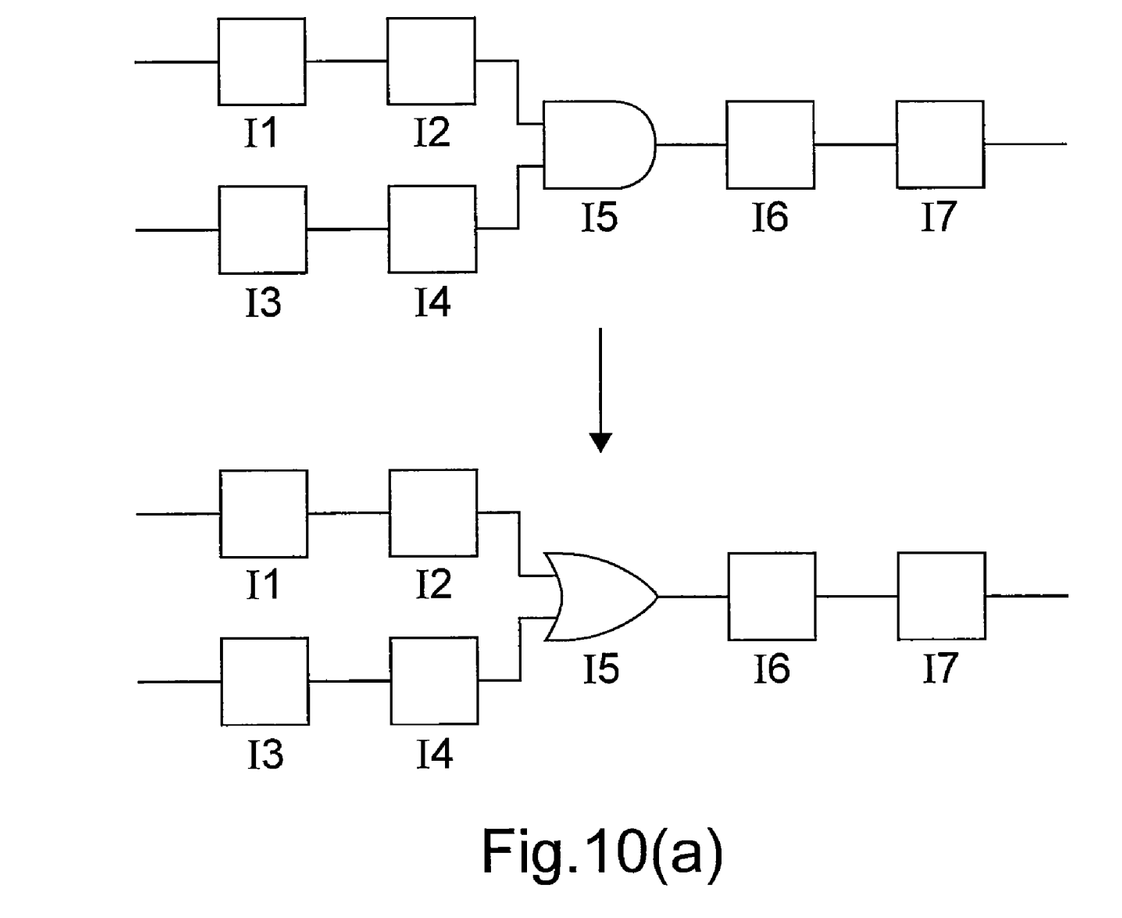
FIGS. 10(a), 10(b), and 10(c) are diagrams illustrating three examples of Functional ECO, respectively.
Figure 10B:
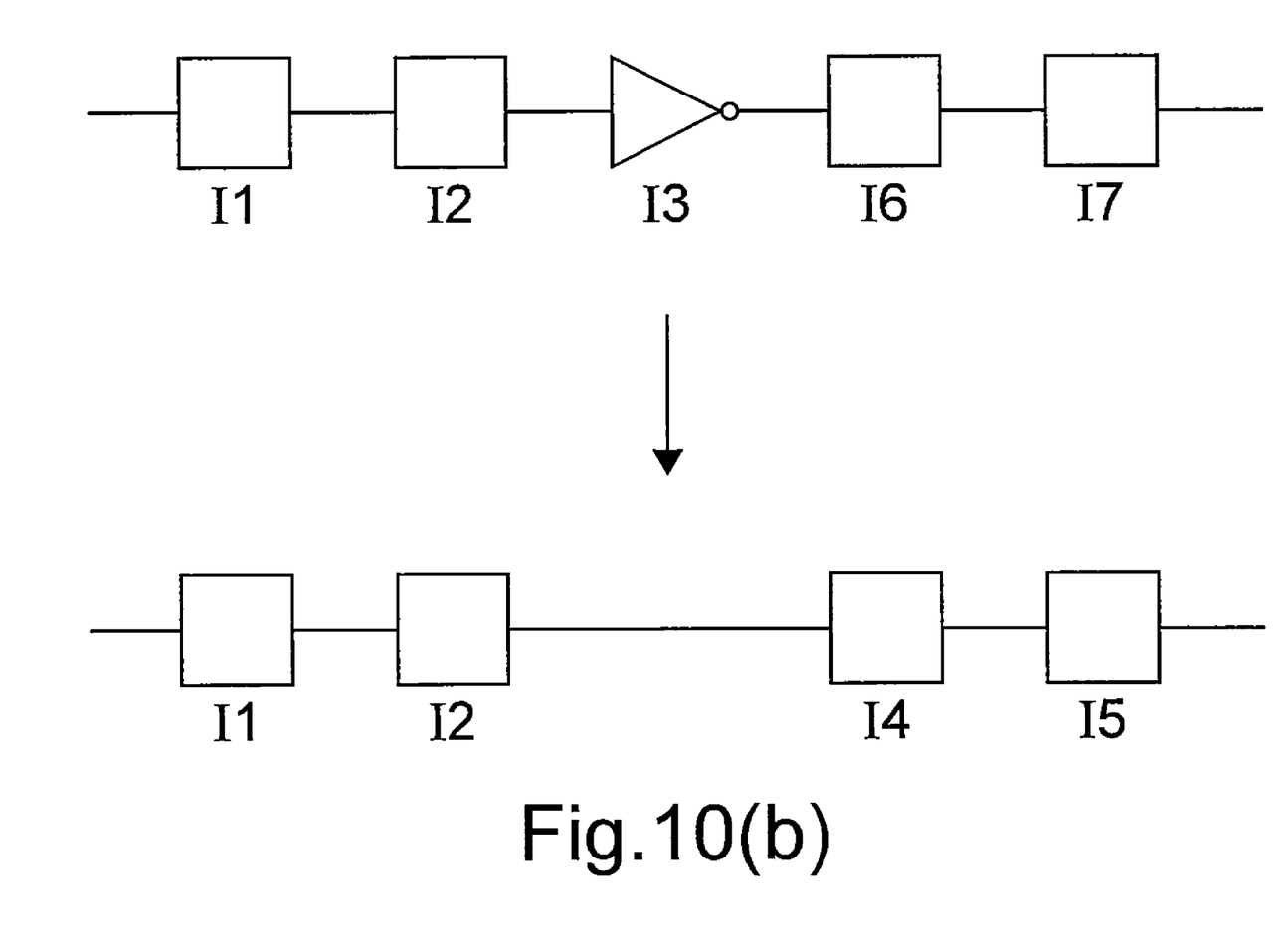
Figure 10C:
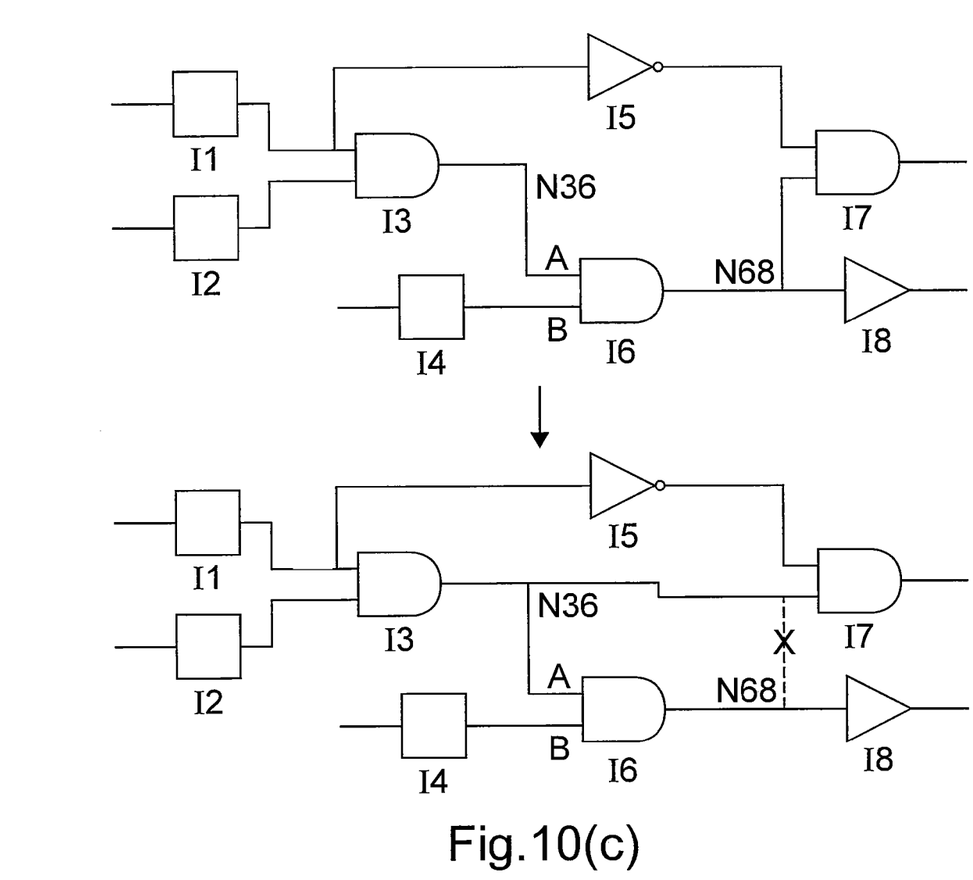

In order to achieve timing and/or functional requirements, IC designers may use Timing ECO or Functional ECO to modify the netlist. The Timing ECO, for example, includes cell sizing, buffer insertion and buffer removal, as depicted in FIGS. 9(*a*), 9(*b*) and 9(*c*), respectively. The Functional ECO, for example, includes replacement instance, deletion instance and connection change, as depicted in FIGS. 10(*a*), 10(*b*) and 10(*c*), respectively. Afterwards, the updated timing data can be realized through the RC estimator and the incremental delay calculator of FIG. 5 (known pin transition timing data) or FIG. 6 (unknown pin transition timing data).

In the case that the pin transition timing data is known, the incremental delay calculator of FIG. 5 can be adapted after the Timing ECO modification. The net connected to the cell I3 is first operated with the RC estimation procedure to obtain new RC network. Since the pin transition timing data of each cell is known and the input transition timing data of the cell I2 will not vary with the change of the cell I3, the incremental delay calculation may start with the cell I2. Through the propagation from the input transition timing data of the cell I2, the incremental delay calculator may calculate the timing data of each cell.

On the other hand, if the pin transition timing data is unknown, the incremental delay calculator of FIG. 6 can be adapted after Timing ECO modification. Likewise, the modified net connected to the cell I3 is first operated with the RC estimation procedure so as to obtain new RC network. Since the input transition timing data of a cell will not vary with the change of the load connected thereto, we can realize whether the cell I3 is altered according to the old and new netlists. Consequently, for renewing the timing data such as input transition timing data and cell delay of a cell following the cell I3, it is necessary to trace back to the cell I1 whose timing data will not vary with the change of the cell I3. Accordingly, the incremental delay calculation includes steps of performing RC estimation of the modified net connected to the cell I3 to realize new RC network; starting the incremental delay calculation from the cell I1; performing DTCC operation to realize the input transmission timing data of the cell I1 if the pin transition timing data of the cell I1 is unknown but the cell delay data of the cell I1 is known; and calculating the timing data of each cell through the propagation from the input transition timing data of the cell I1.

Furthermore, in the case that the pin transition timing data is known, the incremental delay calculator of FIG. 5 can be adapted after the functional ECO modification, e.g. replacement instance. Please refer to the example as illustrated in FIG. 10(*a*), wherein the cell I5 is changed from an AND gate to an OR gate. The modified net connected to the cell I5 is first operated with the RC estimation procedure so as to obtain new RC network. Then, trace back from the OR gate I5. Since the input transition timing data of the cell I2 and the cell I4 will not vary with the change of the cell I5, the incremental delay calculation may start with the cells I2 and I4. Through the propagation from the input transition timing data of the cells I2 and I4, the incremental delay calculator may calculate the timing data of each cell.

On the other hand, if the pin transition timing data is unknown, the incremental delay calculator of FIG. 6 can be adapted after the functional ECO modification, e.g. replacement instance. Please refer to the example as illustrated in FIG. 10(*a*), wherein the cell I5 is changed from an AND gate to an OR gate. The net connected to the cell I5 is first operated with the RC estimation procedure so as to obtain new RC network. Then, trace back from the OR gate I5 to the cell I1 and the cell I3 whose input transition timing data will not vary with the change of the cell I5. Start with the cells I2 and I4 to perform the incremental delay calculation. If the pin transition timing data of the cells I1 and I3 are unknown but the cell delay data of the cells I1 and I3 are known, perform the DTCC operation to realize the input transmission timing data of the cells I1 and I3. Through the propagation of the input transition timing data of the cells I1 and I3, the incremental delay calculator may calculate the timing data of each cell.

Furthermore, please refer to the example as illustrated in FIG. 10(*b*), wherein the NOT gate I3 is deleted. In the case that the pin transition timing data is known, the incremental delay calculator of FIG. 5 can be adapted after the Functional ECO modification, e.g. deletion instance. The net connected to the cell I5 is first operated with the RC estimation procedure so as to obtain new RC network. Then, trace back from the OR gate I5. Since the input transition timing data of the cell I2 and the cell I4 will not vary with the change of the cell I5, the incremental delay calculation may start with the cells I2 and I4. Through the propagation of the input transition timing data of the cells I2 and I4, the incremental delay calculator may calculate the timing data of each cell.

On the other hand, if the pin transition timing data is unknown, the incremental delay calculator of FIG. 6 can be adapted after the Functional ECO modification, e.g. deletion instance of FIG. 10(*b*). The net connected to the NOT gate I3 is first operated with the RC estimation procedure so as to obtain new RC network. Then, trace back from the NOT gate I3 to the cell I1 whose input transition timing data will not vary with the change of the cell I3. Start with the cell I1 to perform the incremental delay calculation. If the pin transition timing data of the cell I1 is unknown but the cell delay data of the cell I1 is known, perform the DTCC operation to realize the input transmission timing data of the cells I1. Through the propagation of the input transition timing data of the cells I1, the incremental delay calculator may calculate the timing data of each cell.

Furthermore, please refer to the example as illustrated in FIG. 10(*c*), wherein the net N36 and the net N68 respectively connected to the cell I3 and the cell I6 are modified. In the case that the pin transition timing data is known, the incremental delay calculator of FIG. 5 can be adapted for a further functional ECO modification, e.g. connection change instance. The nets N36 and N68 are first operated with the RC estimation procedure so as to obtain new RC network. Then, trace back from the nets N36 and N68. Since the input transition timing data of the cell I3 and the cell I6/B will not vary with the change of the nets N36 and N68, the incremental delay calculation may start with the cells I3 and I6/B. Through the propagation of the input transition timing data of the cells I3 and I6/B, the incremental delay calculator may calculate the timing data of each cell.

On the other hand, if the pin transition timing data is unknown, the incremental delay calculator of FIG. 6 can be adapted after the Functional ECO modification, e.g. connection change instance of FIG. 10(*c*). The nets N36 and N68 are first operated with the RC estimation procedure so as to obtain new RC network. Then, trace back from the nets N36 and N68 to the cells I1, I2 and I4 whose input transition timing data will not vary with the change of the nets N36 and N68. Start with the cells I1, I2 and I4 to perform the incremental delay calculation. If the pin transition timing data of the cells I1, I2 and I4 are unknown but the cell delay data of the cells I1, I2 and I4 are known, perform the DTCC operation to realize the input transmission timing data of the cells I1,I2 and I4. Through the propagation of the input transition timing data, the incremental delay calculator may calculate the timing data of each cell.

To sum up, according to the present invention, after a netlist is modified as a result of the whole chip RC extraction and whole netlist delay, simplified RC estimation and incremental delay calculation are performed first to verify the new netlist. The physical design need be modified according to the new netlist and subjected to further RC extraction and whole netlist delay only when the new netlist with the new timing data resulting from the RC estimation and incremental delay calculation has passed the timing and/or functional verification. In other words, the present invention provides an auxiliary method for a circuit design for use in a computer system, which skips some complicated procedures from the modifying and verifying process of physical design so as to reduce the design time of an IC.

The present invention is intended to cover various modifications and similar arrangements included to within the spirit and scope of the appended claims, which are to be accorded with the broadest interpretation so as to encompass all such modifications and similar structures.

What is claimed is:

1. An auxiliary method for circuit design performed by a computer system adapted to carry out the method, said method comprising the steps of:
   a) implementing a first physical design according to a first netlist to obtain a first physical layout of a circuit;
   b) processing the first physical layout of the circuit to obtain a first timing data;
   c) performing timing verification of the first netlist according to the first timing data;
   d) modifying the first netlist into a second netlist if the first netlist does not pass the verification, while defining a first modified portion of netlist;
   e) processing the first modified portion of netlist with an incremental delay calculation for calculating a timing data, and when a pin transition timing data of each cell included in the first modified portion of netlist is unknown, deriving an input transition timing data and an output effective capacitance from the timing data, deriving a solution set consisting of a plurality of solutions of the input transition timing data and the output effective capacitance by way of numerical analysis, and selecting one of the solutions according to a practical design, thereby obtaining a second timing data;
   f) performing timing verification of the second netlist according to the first timing data that is partially modified with the second timing data; and
   g) modifying the first physical design into a second physical design according to the second netlist if the second netlist passes the timing verification.

2. The auxiliary method according to claim 1, further comprising the following steps after the step g):
   h) implementing the second physical design according to the second netlist to obtain a second physical layout of the circuit;
   i) processing the second physical layout of the circuit to obtain a third timing data;
   j) performing timing verification of the second netlist according to the third timing data; and
   k) completing the circuit design if the second netlist passes the timing verification of the step j).

3. The auxiliary method according to claim 2 wherein the first physical layout of the circuit in the step b) and the second physical layout of the circuit in the step i) are processed with whole RC extraction and whole netlist delay calculation, and the first modified portion of netlist in the step e) is processed with RC estimation and the incremental delay calculation.

4. The auxiliary method according to claim 1, further comprising the following steps after the step f):
   l) modifying the second netlist into a third netlist if the second netlist does not pass the timing verification, while defining a second modified portion of netlist;
   m) processing the second modified portion of netlist to obtain a fourth timing data;
   n) performing timing verification of the third netlist according to the first timing data that is partially modified with the second timing data and then the fourth timing data; and
   o) modifying the first physical design into a third physical design according to the third netlist if the third netlist passes the timing verification.

5. The auxiliary method according to claim 4 wherein the first physical layout of the circuit in the step b) is processed with whole RC extraction and whole netlist delay calculation, and the first modified portion of netlist and second modified portion of netlist in the steps e) and m) are processed with partial RC estimation and the incremental delay calculation.

6. The auxiliary method according to claim 1 wherein in the step e), the first modified portion of netlist is processed with partial RC estimation and the incremental delay calculation.

7. The auxiliary method according to claim 6 wherein the RC estimation includes sub-steps of:
   inputting netlist modification data, placement database and RC statistic database to an RC estimator;
   using the RC estimator to build a routing estimation tree with a driver pin of each modified net as a root and a sink pin of each modified net as a leaf, wherein the positions of the roots and leaves of the routing estimation tree are realized from the placement database, and positions of sub-nodes of the modified nets are determined by relative positions of the leaves; and
   estimating resistance and capacitance per unit length according to the RC statistic database, thereby obtaining estimated RC network.

8. The auxiliary method according to claim 1 wherein the first modified portion of netlist includes at least a modified cell, a first cell whose input transition timing data varies with the change of the modified cell and a second cell that adjoins the first cell and whose input transition timing data does not vary with the change of the modified cell.

9. The auxiliary method according to claim 8 wherein when the pin transition timing data of each cell included in the first modified portion of netlist is known, an incremental delay calculator is used to calculate timing data of each cell in the first modified portion of netlist, starting from the second cell, by propagating input transition timing data of the second cell.

10. The auxiliary method according to claim 9 wherein the RC estimator and the incremental delay calculator are implemented with software.

11. The auxiliary method according to claim 8 wherein when the pin transition timing data of each cell included in the first modified portion of netlist is unknown, the incremental delay calculation includes sub-steps of:
    using a DTCC device to calculate input transition timing data of the second cell; and
    using an incremental delay calculator to calculate timing data of each cell in the first modified portion of netlist by propagating the input transition timing data of the second cell.

12. The auxiliary method according to claim 11 wherein the RC estimator and the incremental delay calculator are implemented with software.

13. The auxiliary method according to claim 11 wherein the incremental delay calculator includes a delay calculator core for calculating the timing data and the timing data include cell delay, interconnect delay and pin transition timing data.

14. The auxiliary method according to claim 13 wherein the DTCC device includes a first delay transition effective capacitance converter for deriving the solution set and a second delay transition effective capacitance converter for selecting the one of the solutions.

15. The auxiliary method according to claim 6 wherein in the step b), the first physical layout of the circuit is processed with whole RC extraction and whole netlist delay calculation.

16. The auxiliary method according to claim 1 wherein the first netlist in the step d) is modified with a timing ECO process.

17. The auxiliary method according to claim 16 wherein the timing ECO includes cell sizing, buffer insertion or buffer removal.

18. The auxiliary method according to claim 16 wherein the first netlist in the step d) is further modified with a functional ECO which includes replacement instance, deletion instance or connection change.

19. The auxiliary method according to claim 1 wherein in the step f), a part of the first timing data is overwritten by the second timing data, and then inputted for the timing verification of the second netlist.

* * * * *